United States Patent
Carricarte et al.

(10) Patent No.: US 9,973,582 B2
(45) Date of Patent: May 15, 2018

(54) METHOD AND APPARATUS FOR BI-DIRECTIONAL COMMUNICATION AND DATA REPLICATION BETWEEN MULTIPLE LOCATIONS DURING INTERMITTENT CONNECTIVITY

(71) Applicant: Tritan Software International, Cork (IE)

(72) Inventors: Andrew L. Carricarte, Miami, FL (US); Dario Va, Weston, FL (US); Abel Jose Almeida, Miami, FL (US)

(73) Assignee: Tritan Software International, Cork (IE)

( * ) Notice: Subject to any disclaimer, the term of this patent is extended or adjusted under 35 U.S.C. 154(b) by 0 days. days.

(21) Appl. No.: 15/621,617

(22) Filed: Jun. 13, 2017

(65) Prior Publication Data
US 2017/0279901 A1 Sep. 28, 2017

Related U.S. Application Data

(63) Continuation-in-part of application No. 14/203,265, filed on Mar. 10, 2014, which is a
(Continued)

(51) Int. Cl.
*G06F 15/16* (2006.01)
*H04L 29/08* (2006.01)
(Continued)

(52) U.S. Cl.
CPC ...... *H04L 67/148* (2013.01); *G06F 17/30581* (2013.01); *H04W 76/021* (2013.01); *H04W 76/028* (2013.01)

(58) Field of Classification Search
CPC .......... G06F 2201/80; G06F 17/30578; G06F 17/30371; G06F 17/30377;
(Continued)

(56) References Cited

U.S. PATENT DOCUMENTS

| | | |
|---|---|---|
| 5,390,238 A | 2/1995 | Kirk et al. |
| 6,578,069 B1 | 6/2003 | Hopmann et al. |

(Continued)

*Primary Examiner* — Djenane Bayard
(74) *Attorney, Agent, or Firm* — Burr & Forman LLP; Jeffrey H. Kamenetsky

(57) ABSTRACT

A method and database server for synchronizing contents of a local database with contents of a remote database. The method includes writing data transactions to a local transaction log file, assigning bin numbers to the data transactions, and determining if the assigned bin numbers have changed due to receipt of subsequent data transactions and if the bin numbers have changed, inserting the subsequent data transactions into a local sequence log file and assigning the subsequent data transactions a first sequence number. The method includes providing, to a remote replicator service, access to the first sequence number, the remote replicator service having access to a second sequence number, and if the first sequence number does not match the second sequence number, providing to the remote replicator service access to the subsequent data transactions, the remote replication service updating a remote database to include the subsequent data transactions.

20 Claims, 10 Drawing Sheets

Related U.S. Application Data continuation-in-part of application No. 12/581,533, filed on Oct. 19, 2009, now Pat. No. 8,671,155.

(51) Int. Cl.
 *G06F 17/30* (2006.01)
 *H04W 76/02* (2009.01)

(58) Field of Classification Search
 CPC ......... G06F 17/30368; G06F 17/30575; G06F 17/30581; G06F 11/1474
 See application file for complete search history.

(56) References Cited

U.S. PATENT DOCUMENTS

| | | | |
|---|---|---|---|
| 7,007,003 B1 | 2/2006 | Rybicki | |
| 7,032,022 B1 | 4/2006 | Shanumgam et al. | |
| 2001/0002900 A1 | 6/2001 | Romrell | |
| 2002/0059400 A1 | 5/2002 | Ikami et al. | |
| 2003/0212709 A1 | 11/2003 | De Schrijver | |
| 2004/0158549 A1 | 8/2004 | Matena et al. | |
| 2004/0193942 A1 | 9/2004 | Barr et al. | |
| 2005/0080796 A1* | 4/2005 | Midgley | G06F 17/30067 |
| 2005/0086071 A1 | 4/2005 | Fox, Jr. et al. | |
| 2005/0192838 A1 | 9/2005 | Jones et al. | |
| 2006/0195340 A1 | 8/2006 | Smitherman et al. | |
| 2006/0195487 A1* | 8/2006 | Cooke | G06F 17/30578 |
| 2006/0282474 A1 | 12/2006 | MacKinnon, Jr. | |
| 2008/0046292 A1 | 2/2008 | Myers et al. | |
| 2008/0177576 A1 | 7/2008 | Jennings et al. | |
| 2009/0222539 A1 | 9/2009 | Lewis et al. | |
| 2010/0077017 A1 | 3/2010 | Martinez et al. | |
| 2010/0235676 A1 | 9/2010 | Aboel-Nil et al. | |
| 2010/0299163 A1 | 11/2010 | Kwan | |
| 2010/0332818 A1 | 12/2010 | Prahlad et al. | |
| 2011/0009075 A1 | 1/2011 | Jantunen et al. | |
| 2011/0034144 A1 | 2/2011 | Yang et al. | |
| 2011/0169603 A1 | 7/2011 | Fithian et al. | |
| 2012/0215779 A1 | 8/2012 | Lipstone | |
| 2013/0151545 A1 | 6/2013 | Naaman et al. | |
| 2013/0324263 A1 | 12/2013 | Ahiska et al. | |
| 2014/0280695 A1 | 9/2014 | Sharma et al. | |
| 2016/0224434 A1* | 8/2016 | Winokur | G06F 17/30197 |

* cited by examiner

METHOD AND APPARATUS FOR BI-DIRECTIONAL COMMUNICATION AND DATA REPLICATION BETWEEN MULTIPLE LOCATIONS DURING INTERMITTENT CONNECTIVITY

CROSS-REFERENCE TO RELATED APPLICATION

This application is a continuation-in-part-of U.S. patent application Ser. No. 14/203,265, filed Mar. 10, 2014, entitled SYSTEM AND METHOD OF EMPLOYING A CLIENT SIDE DEVICE TO ACCESS LOCAL AND REMOTE DATA DURING COMMUNICATION DISRUPTIONS, which is a continuation-in-part of U.S. patent application Ser. No. 12/581,533, filed Oct. 19, 2009, now U.S. Pat. No. 8,671,155, the entirety of which are incorporated herein by reference.

STATEMENT REGARDING FEDERALLY SPONSORED RESEARCH OR DEVELOPMENT n/a

TECHNICAL FIELD

The invention relates to systems and methods of providing centralized client-side data storage and retrieval on a local network. More particularly, the invention relates to systems and methods of converting data having multiple formats to a predefined format, providing centralized client-side data storage and retrieval of the converted data, and synchronizing local and remote databases.

BACKGROUND

Client terminals having software applications that access data stored on remote servers are well-known. The client terminals access the Internet or other remote networks to obtain web-based application data that is stored on remote servers. During communication outages, the client terminals are not able to access the remote servers hosting the web-based data. Thus, communication outages may cause client terminal users to experience productivity loss, data loss, or other losses.

Client terminals may include applications that store data on the respective client terminal devices and provide off-line access to the stored data. Known client terminal devices store the data in a format that is defined by the application that generates the data. Known systems require each application to generate and store data in a separate database on the client terminal device. Each separate database is distributed and is accessible only to the application that generated the data. In other words, known systems do not grant data access to other applications running on the client terminal devices that did not generate the data. Various other drawbacks exist with these known systems and with other systems known in the prior art.

SUMMARY

Various aspects of the invention overcome at least some of these and other drawbacks of existing systems. The invention advantageously discloses a method and system for providing a plurality of client terminal devices with connectivity to a central device during off-line operation.

In one embodiment, the invention provides a local communication device that locally stores data obtained from a plurality of sources, including a remote server, a local server and a client terminal device. The remote server is associated with an external network and the local server is associated with an internal network. The client terminal device communicates with the remote server over the external network and communicates with the local server over the internal network. The local communication device includes a software agent that communicates with the local server, the remote server and the client terminal device to gather the data from the local server, the remote server and the client terminal device and provides access to the data during time periods when a data connection is disrupted between the client terminal device and the local server or the remote server. The local communication device further includes a storage module that is adapted to store the gathered data to at least one memory device and a conversion module that generates a predefined format for the gathered data.

In another embodiment of the invention, the invention provides a local communication device that locally stores data obtained from a plurality of sources, including a remote server, a local server and a client terminal device. The remote server is associated with an external network and the local server is associated with an internal network. The client terminal device communicates with the remote server over the external network and communicates with the local server over the internal network. The local communication device includes a software agent that communicates with the local server, the remote server and the client terminal device to gather the data from the local server, the remote server and the client terminal device and provides access to the data during time periods when a data connection is disrupted between the client terminal device and the local server or the remote server. The local communication device further includes a database module that generates and manages at least one database, a storage module that is adapted to store the gathered data to the at least one database, a conversion module that generates a predefined format for the gathered data and a synchronizing module that maintains a data version tag for the data stored in the at least one database.

In yet another embodiment of the invention, a method of facilitating off-line connectivity to a central database is provided. A local communication device stores the data transmitted between selected sources and the client terminal devices and monitors whether the client terminal devices are communicating with the selected sources. When the client terminal devices become decoupled from the selected sources, the local communication device establishes a data connection with the client terminal devices, transmits data to the client terminal devices, and assigns a synchronization start identifier, one or more synchronization intermediate identifiers and a synchronization completed identifier to facilitate data transfer with the selected sources. The local communication device monitors whether a data connection is re-established between the client terminal devices and the selected sources and re-establishes a data connection between the client terminal devices and the selected sources when the client terminal devices are coupled to the selected sources.

Data is transmitted between selected sources and client terminal devices and the data is stored to a local communication device. If a communication channel between the client terminal devices and the selected sources is disrupted, then a data connection is established between the client terminal devices and the local communication device. During the network outage, data is transmitting between the local communication device and the client terminal devices. The local communication device and the selected sources synchronize the stored data to provide the latest retrieved data. The client terminal devices are coupled to the selected sources upon determining that the data connection is re-established between the client terminal devices and the selected sources and any data that is entered during offline operation may be synchronized to the selected data source.

In another embodiment of the present disclosure, a method for synchronizing contents of a local database with contents of a remote database, is provided. The method includes writing at least one data transaction received from a user terminal from the local database to a local transaction log file, assigning a bin number to each of the at least one data transaction, and determining if the assigned bin number has changed due to receipt of at least one subsequent data transaction. If the bin number has changed, the method further includes inserting the at least one subsequent data transaction into a local sequence log file and assigning the at least one subsequent data transaction a first sequence number, and in response to a request by a remote replicator service, providing, to the remote replicator service, access to the first sequence number, the remote replicator service having access to a second sequence number stored in the remote database. If the first sequence number does not match the second sequence number, the method further includes providing, to the remote replicator service, access to the at least one subsequent data transaction associated with the first sequence number, the remote replication service updating the remote database to include the at least one subsequent data transaction.

In another embodiment of the present disclosure, a local database server configured to synchronize contents of a local database with contents of a remote database, is provided. The local database server includes processing circuitry including a memory and a processor, the memory in communication with the processor, the memory having instructions that, when executed by the processor, configure the processor to write at least one data transaction received from a user terminal from the local database to a local transaction log file, assign a bin number to each of the at least one data transaction, and determine if the assigned bin number has changed due to receipt of at least one subsequent data transaction. If the bin number has changed, the processor is further configured to insert the at least one subsequent data transaction into a local sequence log file and assign the at least one subsequent data transaction a first sequence number. The local database server further includes a communication interface configured to receive a request from a remote replicator service. In response to the request from the remote replicator service, the processor is further configured to provide, to the remote replicator service, access to the first sequence number, the remote replicator service having access to a second sequence number stored in the remote database, and if the first sequence number does not match the second sequence number, provide, to the remote replicator service, access to the at least one subsequent data transaction associated with the first sequence number, the remote replication service updating the remote database to include the at least one subsequent data transaction.

In another embodiment of the present disclosure, a remote database server configured to synchronize contents of a local database with contents of a remote database, is provided. The remote database server includes a communications interface configured to receive, from a local replicator service, a first sequence number, the first sequence number associated with at least one data transaction stored in a local transaction log file, and processing circuitry including a memory and a processor, the memory in communication with the processor, the memory having instructions that, when executed by the processor, configure the processor to compare the first sequence number received from the local replicator service to a second sequence number, the second sequence number associated with a latest data transaction stored in the remote database. If the first sequence number does not match the second sequence number, the processor is further configured to obtain from the local replicator service, via the communications interface, the at least one data transaction associated with the first sequence number and to write the at least one data transaction to the remote database.

In another embodiment of the present disclosure, a system for synchronizing data transactions stored in a local database with data transactions stored in a remote database, is provided. The system includes a local database server, the local database server including processing circuitry including a memory and a processor, the memory in communication with the processor, the memory having instructions that, when executed by the processor, configure the processor to write at least one data transaction received from a user terminal from the local database to a local transaction log file, assign a bin number to each of the at least one data transaction and determine if the assigned bin number has changed due to receipt of at least one subsequent data transaction. If the bin number has changed, the processor is further configured to insert the at least one subsequent data transaction into a local sequence log file and assign the at least one subsequent data transaction a first sequence number. The local database server also includes local communication interface configured to communicate with remote replicator service. The system also includes a remote database server. The remote database server includes a remote communications interface configured to receive, from the local replicator service, the first sequence number, and processing circuitry including a memory and a processor, the memory in communication with the processor, the memory having instructions that, when executed by the processor, configure the processor to compare the first sequence number received from the local replicator service to a second sequence number, the second sequence number associated with a latest data transaction stored in the remote database, and if the first sequence number does not match the second sequence number. The processor is further configured to obtain from the local replicator service, via the remote communications interface, the at least one data transaction associated with the first sequence number and to write the at least one data transaction to the remote database.

The invention provides numerous advantages over and/or avoids many drawbacks of conventional systems. These and other features and advantages of the invention will be apparent through the detailed description of the embodiments and the drawings attached hereto. It is also understood that both the foregoing general description and the following detailed description are exemplary and not restrictive of the scope of the invention. Numerous other features and advantages of the invention should become apparent upon a reading of the following detailed description when taken in conjunction with the accompanying drawings, a brief description of which is included below.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
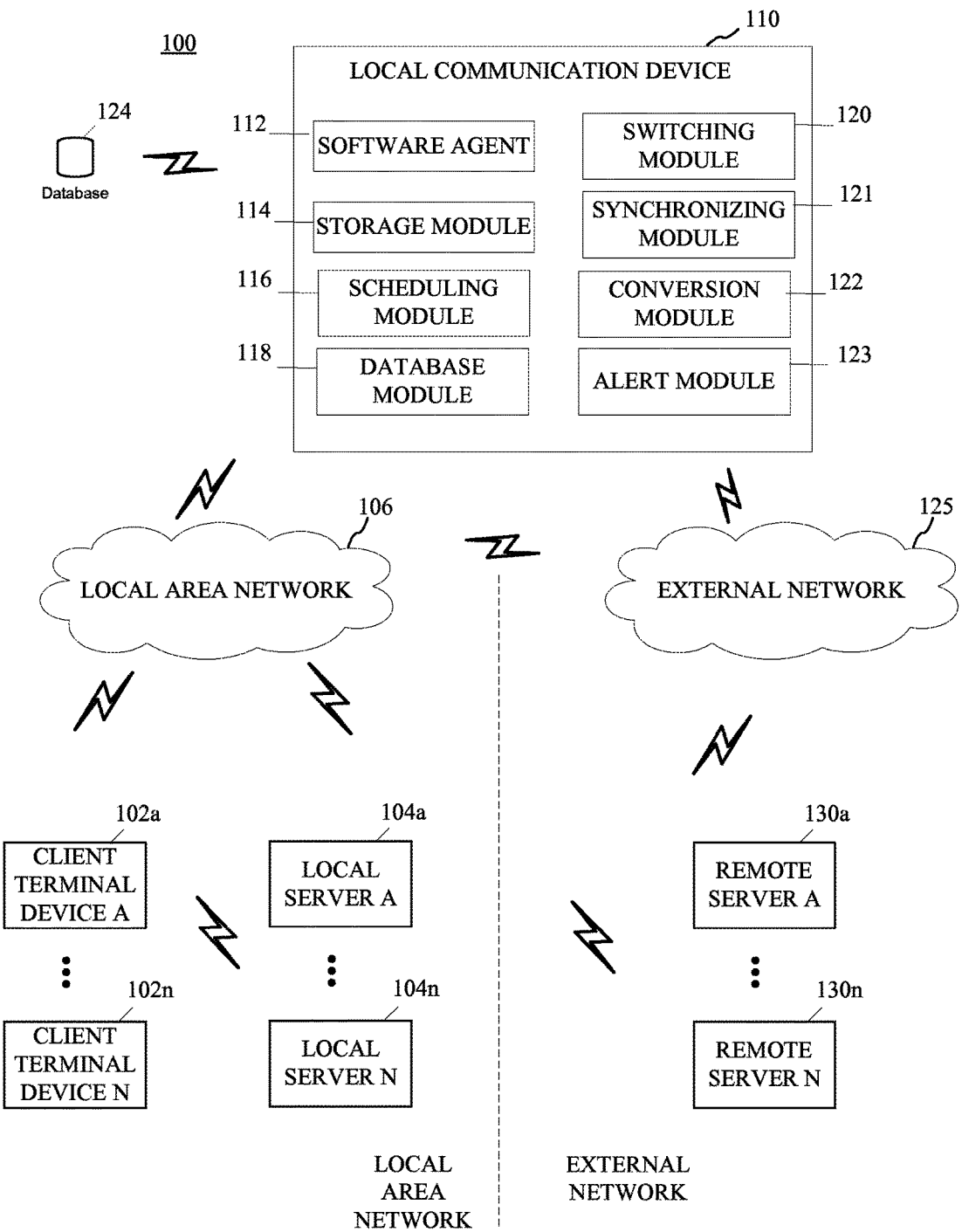
FIG. 1 illustrates a system diagram according to one embodiment of the invention.

The invention provides systems and methods of employing a local communication device that performs centralized client-side data storage and retrieval. The local communication device may be coupled to a plurality of sources, including external networks, internal networks and client terminal devices, among other sources. The local communication device receives data from and transmits data to the plurality of sources and converts the data to preselected formats prior to storage. For example, the local communication device may receive data in any format including MS Word format, MS Excel format, PDF format, or any other format. Prior to storage, the local communication device may convert the received data to preselected formats including Health Level Seven (HL7), Extensible Markup Language (XML), American National Standards Institute (ANSI) standards, viewable format through MEDIOS proprietary application or other preselected formats.

By contrast, known systems employ distributed architectures that include client terminal devices having individual applications that generate distributed databases on the corresponding client terminal device. The distributed databases are stored at the client terminal devices and are accessible only by the individual applications that generate the distributed database. Thus, known systems are deficient at least because the data stored in the distributed database is segmented, non-centralized, non-portable and is available only to the corresponding individual applications.

While specific embodiments of the invention are discussed herein and are illustrated in the drawings appended hereto, the invention encompasses a broader spectrum than the specific subject matter described and illustrated. As would be appreciated by those skilled in the art, the embodiments described herein provide but a few examples of the broad scope of the invention. There is no intention to limit the scope of the invention only to the embodiments described.

Computer networks offer great potential for automating information retrieval and storage. FIG. 1 illustrates an example of the system architecture 100 according to one embodiment of the invention. Client terminal devices 102a-102n (hereinafter identified collectively as 102) may be coupled to one or more local servers 104a-104n (hereinafter identified collectively as 104) and/or to one or more remote servers 130a-130n (hereinafter identified collectively as 130) via a wired network, a wireless network, a combination of the foregoing and/or other networks, such as a local area network 106 and an external network 125. A local communication device 110 may be provided to capture and store data communications between the client terminal devices 102, the local servers 104 and the remote servers 130 and other components.

The local communication device 110 may be of modular construction to facilitate adding, deleting, updating and/or amending modules therein and/or features within modules. Modules may include a software agent 112, a storage module 114, a scheduling module 116, a database module 118, a switching module 120, a synchronizing module 121, a conversion module 122, an alert module 123 or other modules. It should be readily understood that a greater or lesser number of modules might be used. One skilled in the art will readily appreciate that the invention may be implemented using individual modules, a single module that incorporates the features of two or more separately described modules, individual software programs, and/or a single software program.

The software agent 112 may request data from the plurality of sources with or without end user awareness of the data requests. For example, the software agent 112 may capture data exchanges that occur during communications between the client terminal devices 102 and the remote servers 130, wherein the data exchanges are routed through the external network 125, such as the Internet. The software agent 112 may capture the data exchanges in substantially real-time or at predefined intervals. Alternatively, the software agent 112 may trigger capturing the data exchanges based on availability of system resources, such as bandwidth or other system resources. A storage module 114 may be provided to direct the captured data to a desired memory device for storage.

The software agent 112 may include applications that perform the data capture on sources that are coupled to the local communication device 110. The sources may include the client terminal devices 102, the local servers 104, and the remote servers 130, among other sources. For sources that request security credentials (e.g., passwords, digital certificates, etc.) prior to granting access to the data, the software agent 112 may perform authentication prior to requesting the data transfer to the local communication device 110. Alternatively, the software agent 112 may await a user log-in with the security credentials prior to requesting data transfer to the local communication device 110. Local communication device 110 provides access to the data independent of the geographical location or time periods when a data connection is disrupted between the client terminal devices 102 and local communication device 110 or between local communication device 110 and remote servers 130.

If users are not authenticated, then the users may be invited to submit requested information or take other action. If the user is authenticated, then the selected sources may perform other processing. For example, the selected sources may load data or other information (e.g., download) to the client terminal devices 102 that an authorized user may be permitted to access, but has not yet received from the selected sources.

With regard to user authentication, one of several different authentication schemes may be employed, and would be appreciated by those skilled in the art. For example, the user may be asked to input an alphanumeric code. Alternatively, the user may be asked to provide biometric information (i.e., a thumbprint through a fingerprint scanner) or other suitable identifying information. One of ordinary skill in the art will readily recognize that other authentication schemes may be employed.

Figure 2:
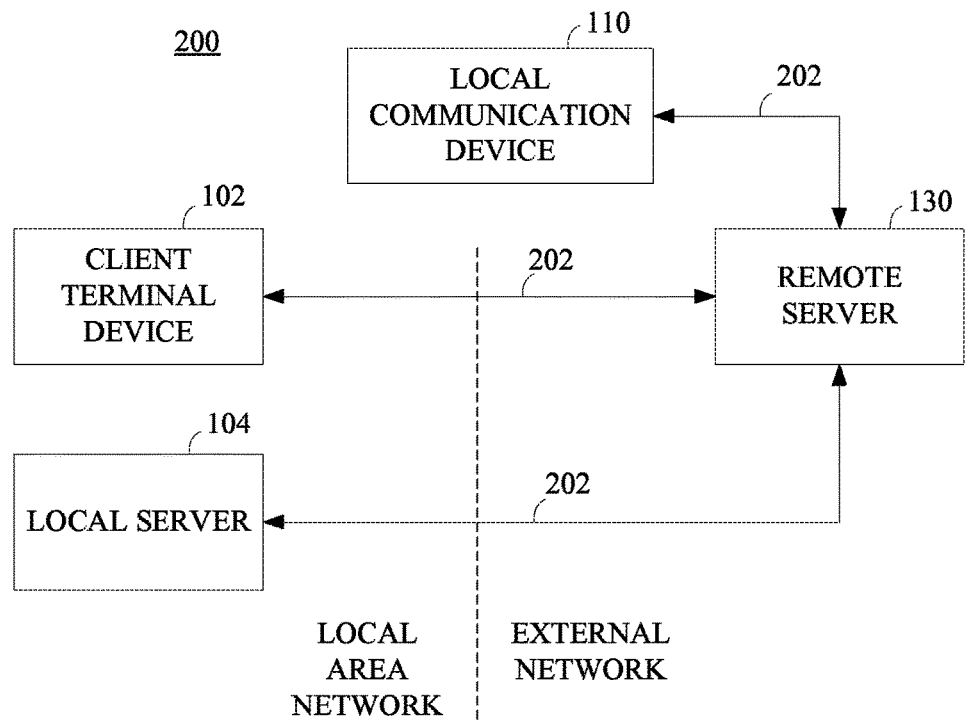
FIG. 2 illustrates an exemplary embodiment of the system of FIG. 1 operating in an environment where external communications paths couple the local devices and the external network devices.

The local communication device 110 may operate as a redundancy device that stores data accessed or data sought to be accessed by the plurality of sources. FIG. 2 illustrates an exemplary embodiment of the system of FIG. 1 operating under conditions where external communication paths 202 couple the remote server 130 to the client terminal devices 102, the local server 104 and/or the local communication devices 110. During operation, the client terminal devices 102 and the local server 104 transmit and receive data from the remote server 130. The local communication device 110 may communicate with the remote server 130 to duplicate and locally store data received from the remote server 130.

Referring to FIG. 1, the software agent 112 may instruct the local communication device 110 to continuously store the requested data. Alternatively, the software agent 112 may instruct the local communication device 110 to update the requested data at predefined schedules or automatically upon availability. A scheduling module 116 may be provided in the local communication device 110 to establish the predefined schedules to include periodic schedules, random schedules, scheduling based on system resources, or other predefined schedules.

The local communication device 110 may include a database module 118 that generates and manages a central database 124. The central database 124 may be accessed by one or more sources, including the client terminal devices 102, the local servers 104 and the remote servers 130. The central database 124 may be structured to minor the data structure of the selected sources, including the client terminal devices 102, the local servers 104 and the remote servers 130.

According to one embodiment, the local communication device 110 may include a switching module 120 that operates to switch a data connection for the client terminal devices 102 between the selected sources and the central database 124. The operation of switching the data connection for the client terminal devices 102 between the selected sources and the central database 124 may be transparent to users of the client terminal devices 102. Alternatively, the operation of switching data connections for the client terminal devices 102 between the selected sources and the central database 124 may be initiated by users of the client terminal devices.

The switching module 120 may include a feature that determines the communication status of the client terminal devices 102. The feature may detect whether the client terminal devices 102 are operating online or offline, relative to the external network 125. Additionally, the switching module 120 may detect a type of network connection for the client terminal devices 102, such as a wired connection, a wireless connection or other network connection. If the client terminal devices 102 are determined to be operating offline relative to the external network 125, then the client terminal devices 102 may be coupled to the corresponding local communication device 110.

Figure 3:
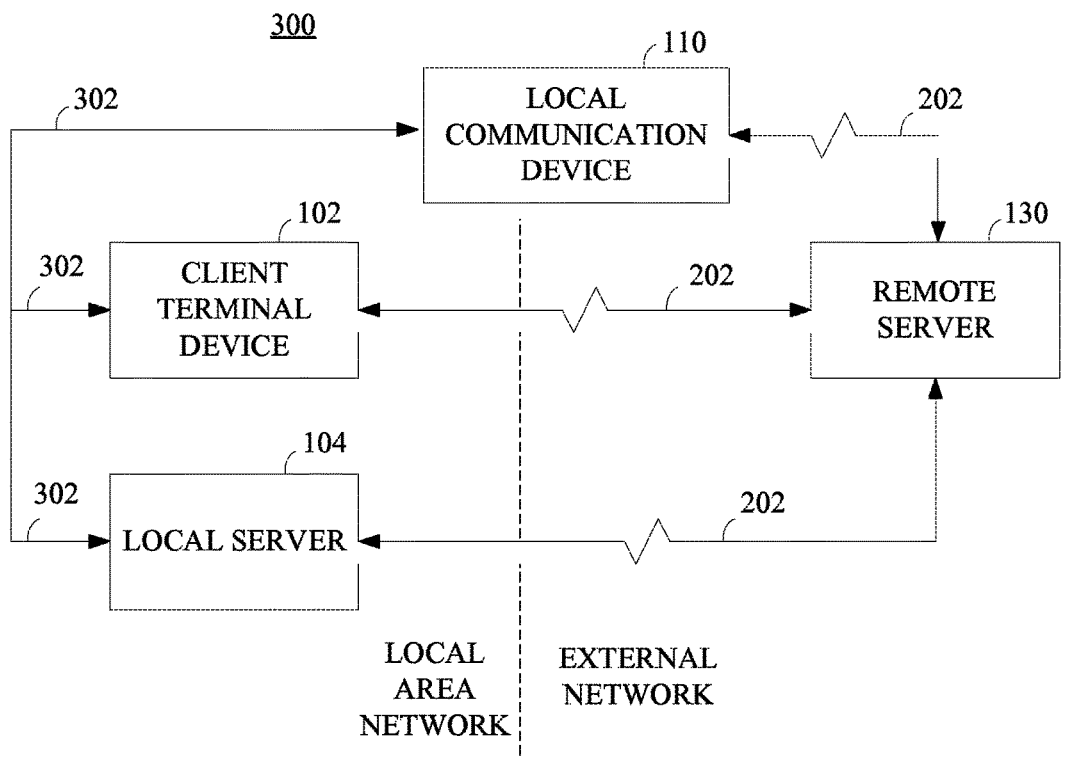
FIG. 3 illustrates an exemplary embodiment of the system of FIG. 1 operating in an environment where external communications paths are decoupled between the local devices and the external network devices and internal communications paths couple the local devices with the local communications device.

FIG. 3 illustrates an exemplary embodiment of the system of FIG. 1 operating in an environment where external communication paths 202 are decoupled between the local devices and the external network devices. Under this condition, internal communication paths 302 are provided to couple the local communications device 110 with the client terminal devices 102 and the local server 104. Since the local communication device 110 locally stores a duplicate of the data stored at the remote server 130, users that are accessing the client terminal devices 102 and the local server 104 do not experience a service disruption when the external communication paths 202 are decoupled.

Regarding transparent switching, the switching module 120 of FIG. 1 may detect trigger events to automatically initiate switching the data connections between the selected sources and the central database 124. The trigger events may include detecting time periods when communication channels to the selected sources are not available, among other trigger events.

Regarding user-initiated switching, the switching module 120 may respond to a manually initiated trigger to switch the data connections between the selected sources and the central database 124. The manually initiated trigger may include enabling users to activate a command at the client terminal devices 102 when communication channels to the selected sources are not available, among other manually initiated triggers.

The local communication device 110 may include a synchronizing module 121 that maintains data version tags for the data stored at the selected sources and the central database 124. The data version tags may be used at the selected sources and the central database 124 to identify the data that is stored most recent in time. According to one embodiment, the synchronizing module 121 may analyze the data version tag and determine whether to replicate data from the selected sources to the central database 124 or from the central database 124 to the selected sources. In this way, the synchronizing module 121 prevents the client terminal devices 102 from accessing expired data. According to one embodiment, the synchronizing module 121 may determine whether the selected sources or the central database 124 is maintaining the most recent data version tag by analyzing which of the selected sources or the central database 124 performed the last save function. Additionally, the remote server 130 may be configured to synchronize a plurality of local communication devices 110 that are spread across multiple networks. The synchronization module 121 may employ a success/fail transaction protocol that ensures data is successfully transferred without any loss of connectivity.

According to one embodiment, the synchronization module 121 may apply a transaction based, encryption and decryption synchronization algorithm to perform data transfers in predefined stages. The predefined stages may include a start point, breakpoints and a commit point. By performing data transfers using stages, the initial data transfer may be completed even if a data transfer communication is interrupted during transmission. The synchronization module 121 identifies a start point to the beginning of a selected data transfer. After identifying the start point, the synchronization module 121 may assign intermediate breakpoints to the transferred data. The breakpoints are provided to recover data transfer operations if an interruption occurs before the data transfer is complete. For example, after experiencing a data transfer interruption, the data transfer operation may begin from a previously identified successful breakpoint. In other words, the synchronization module 121 enables the data transfer operation to recover from a breakpoint or intermediate transfer point, rather than from the start point or the beginning of the data transfer. When the last breakpoint is successfully traversed, the synchronization module 121 assigns an identification number to the data transfer. Additionally, the synchronization module 121 may classify the data transfer as authentic and complete.

In another embodiment, synchronization module 121 is adapted to monitor a broadcast system that is operated over the network device and into the external network over a predefined protocol. A predefined logical port automatically resolves conflicts of data and, via a series of algorithms, and automatically reestablishes synchronization from the local network and a set of one or more external servers.

Figure 4:
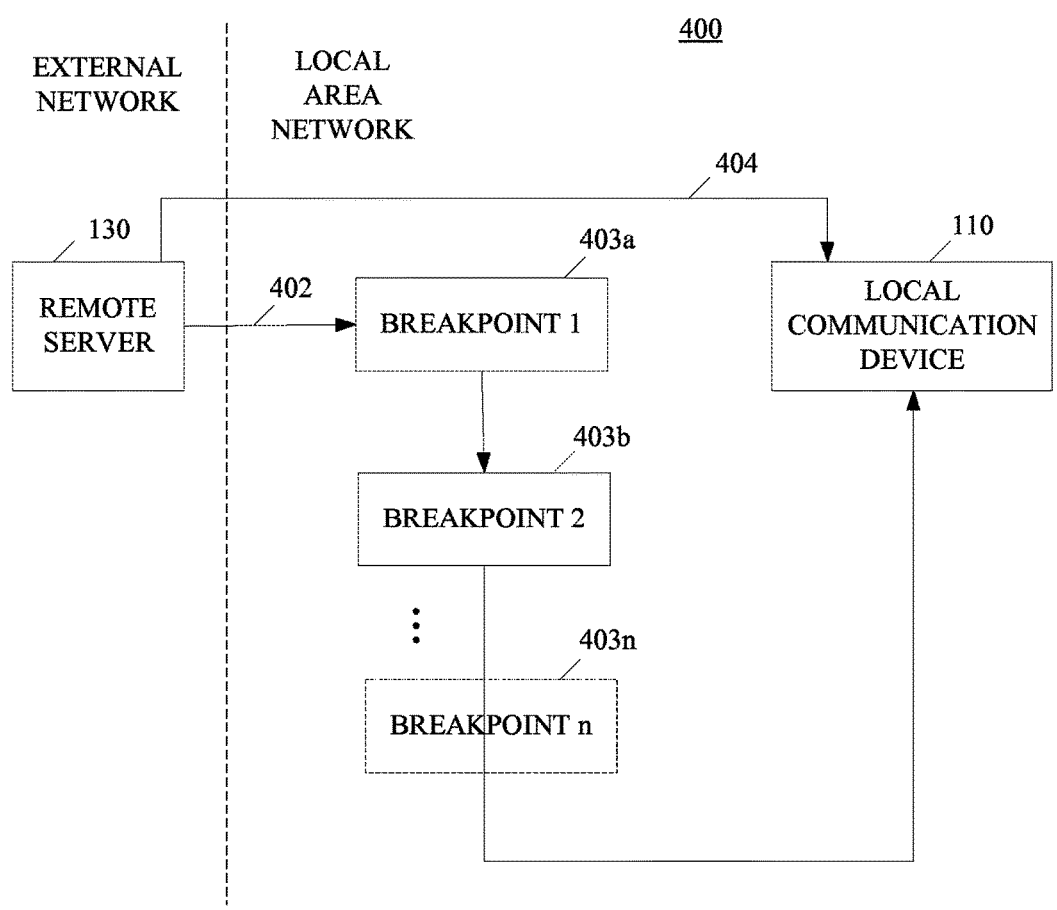
FIG. 4 illustrates a system for transferring data between a remote server and a local communication device according to one embodiment of the invention.

FIG. 4 illustrates a system for performing data transfer. The remote server 130 and the local communication device 110 begin a synchronization process over communication channel 402 using a plurality of intermediate breakpoints or synchronization intermediate identifiers (403a-403n). According to one embodiment, breakpoint 1 (403a) and breakpoint 2 (403b) are established between the remote server 130 and the local communication device 110. During the data transmission, the remote server 130 and the local communication device 110 transmit status information over communication channel 404.

According to one embodiment, the data transmission may occur without experiencing a data transfer interruption. For a synchronization transfer between the remote server 130 and the local communication device 110, the synchronization module 121 may identify a Start Point 1 or start identifier at 01/01/Yr1, 03:00:00 SERVER TIME and data transfer may begin over communication channel 402. The data transfer may traverse BREAKPOINT 1 (403a) at 01/01/Yr1, 03:03:00 SERVER TIME and may traverse BREAKPOINT 2 (403b) at 01/01/Yr1, 03:06:00 SERVER TIME and be successfully completed. Upon success completion, the synchronization module 121 may establish a COMMIT POINT and assign a synchronization complete identification number ID:0001:01/01/Yr1, 03:06:00 SERVER TIME. The data transfer may be considered complete and authenticated upon assignment of identification number ID:0001.

Alternatively, the data transmission may occur with a data transfer interruption. For a synchronization transfer between the remote server 130 and the local communication device 110, the synchronization module 121 may identify a Start Point 1 at 01/01/Yr1, 03:00:00 SERVER TIME and data transfer may begin over communication channel 402. The data transfer may traverse BREAKPOINT 1 (403a) at 01/01/Yr1, 03:03:00 SERVER TIME and may experience an INTERRUPTION at 01/01/Yr1, 03:04:30 SERVER TIME, such as if the server encounters bandwidth loss. The synchronization module 121 may initiate a rollback to BREAKPOINT 1 at 01/01/Yr1, 03:04:35 SERVER TIME. Upon reestablishment of bandwidth at 01/01/Yr1, 03:20:30 SERVER TIME, the synchronization module 121 may begin the data transfer at BREAKPOINT 1 at 01/01/Yr1, 03:20:35 and may traverse BREAKPOINT 2 at 01/01/Yr1, 03:23:35 SERVER TIME and be successfully completed. Upon success completion, the synchronization module 121 may establish a COMMIT POINT, assign identification number ID:0002:01/01/Yr1, 03:23:35 SERVER TIME. The data transfer may be considered completed authenticated upon assignment of identification number ID:0002.

Referring to FIG. 1, the local communication device 110 may include a conversion module 122 that converts the received data to preselected formats including Health Level Seven (HL7), Extensible Markup Language (XML), American National Standards Institute (ANSI) standards, or other preselected formats prior to storage. Other standards that enable interoperability may be employed, such as but not limited to CCD, DICOM, HIPAA, and HITSP. The ANSI compliant file may be denoted as a Vessel Data Exchange (VDE) file.

The data that is stored in the central database 124 may be searched using a variety of techniques. According to one embodiment, the search may be performed using a structured query language (SQL) that uses SQL statements to perform tasks on the database 124, such as retrieving data from the database 124.

The local communication device 110 may include an alert module 123 that generates notifications and/or alerts in real-time. The generated notifications and/or alerts may be delivered in real-time to notify users of the status of the network connectivity.

The client terminal devices 102 may include any number of different types of client terminal devices, such as medical devices, medical equipment, personal computers, laptops, smart terminals, personal digital assistants (PDAs), mobile devices, cell phones, Web TV systems, video game consoles, and devices that combine the functionality of one or more of the foregoing or other client terminal devices. The client terminal devices 102 may include processors, RAM, USB interfaces, telephone interfaces, satellite interface, microphones, speakers, a stylus, a computer mouse, a wide area network interface, a local area network interface, hard disks, wireless communication interfaces, DVD/CD reader/burners, a keyboard, a flat touch-screen display, and a display, among other components.

According to one embodiment, the client terminal devices 102 may include a touch-sensitive display screen, a handset, speakers and input buttons, among other features. Select functions may be implemented on the client terminal devices 102 by positioning an indicator over selected icons and manipulating an input receiving device such as a touch-sensitive display screen, a mouse, a keyboard, a voice recognition system or other input receiving devices. The client terminal devices 102 may include a video input device to permit audio-visual communication with other client terminal devices 102, such as to permit dictation by medical personnel. The client terminal devices 102 may communicate with the remote servers 130, the local servers 104, other client terminal devices 102 and/or other systems.

Users may access the client terminal devices 102 to communicate with the selected sources, including the client terminal devices 102, the local servers 104 and the remote servers 130. Data requests that originate from the client terminal devices 102 may be broadcast to selected sources and the local communication device 110 in substantially in real-time if the client terminal devices 102 are coupled to networks 106,125. Alternatively, communications from the client terminal devices 102 may be delayed for an amount of time if, for example, a selected client terminal device 102 is not connected to the local area network 106. For example, the data connection between the client terminal device 102 and the local server 104 or the remote server 130 may be disrupted due to a large latency, a delayed connection, or a severed connection, among other disruptions.

According to one embodiment of the invention, any requests that are made while the client terminal devices 102 are not connected to the local area network 106 may be stored and propagated from/to the offline client terminal device 102 when the selected sources, the local communication device 110 and the target client terminal device 102 are re-connected to networks 106/125. For example, if the target client terminal device 102 is not connected to network 106, then requests remain in the corresponding client terminal device 102 for dissemination to the local communication device 110 or the selected sources when the target client terminal devices 102 are re-connected to networks 106/125.

Figure 5:
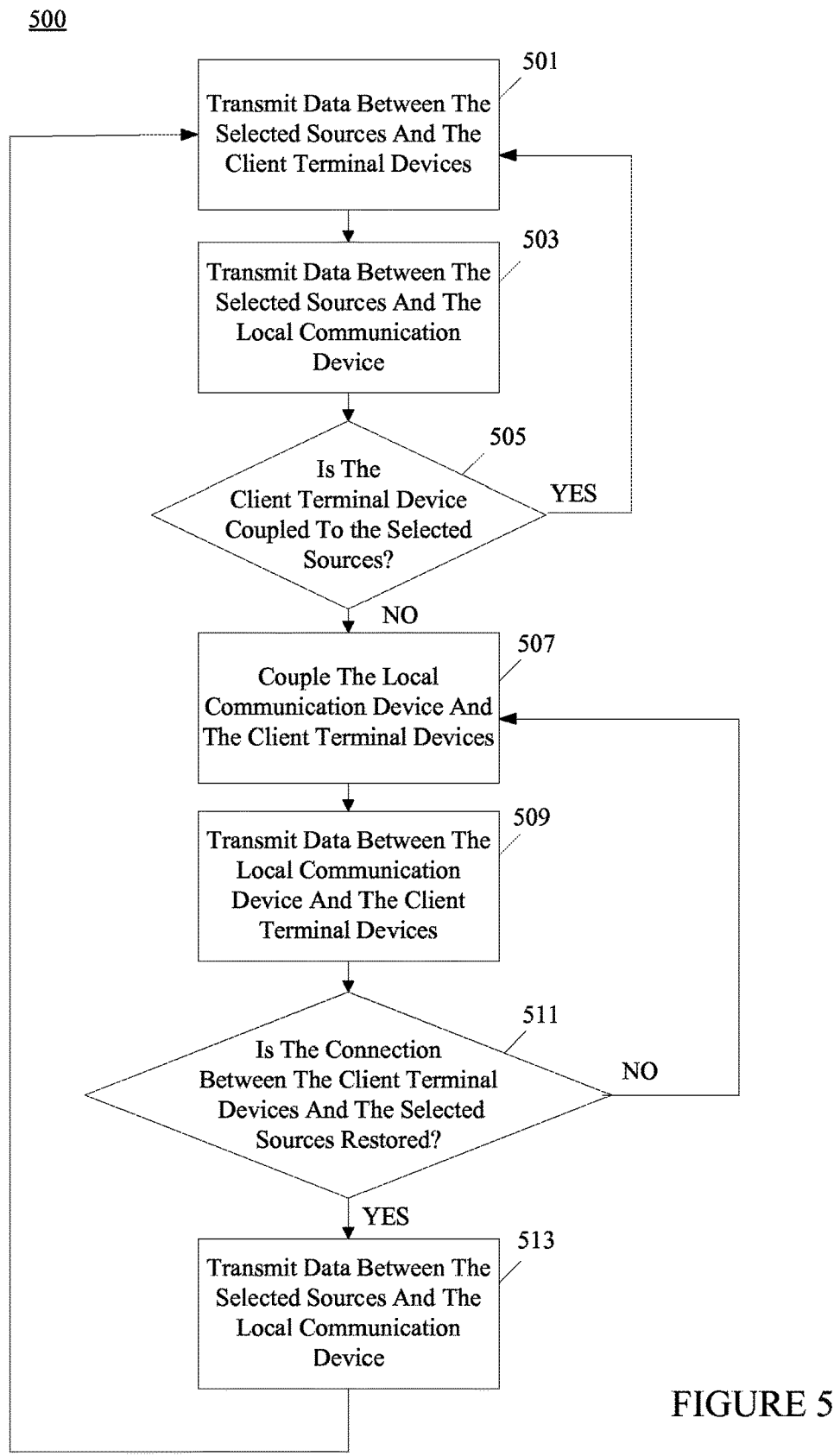
FIG. 5 illustrates a flow chart for providing a plurality of client terminal devices with off-line connectivity to a central database.

FIG. 5 illustrates a method 500 of providing a plurality of client terminal devices with off-line connectivity to a central database. Data is transmitted between the selected sources and the client terminal device 102 in operation 501, wherein data communication is performed via networks 106/125. For example, the network 125 may include the Internet. Data communication between the client terminal devices 120 and the selected sources may occur substantially in real-time if the client terminal devices 102 are connected to the networks 106/125. In operation 503, data is transmitted between the selected sources and the local communication device 110, wherein the data communication is performed via network 106/125. One of ordinary skill in the art will appreciate that communications may be conducted in various ways and among various devices.

A determination is made in operation 505 whether the client terminal devices 102 remain in communication with the selected sources. If the client terminal device 102 and the selected sources remain in communication, then the system returns to operation 501. If the client terminal device 102 and the selected sources are no longer in communication, then the client terminal device 102 is coupled to the local communication device 110 in operation 507. In operation 509, data is transmitted between the client terminal devices 102 and the local communication device 110, wherein the data communication is performed via network 106. One of ordinary skill in the art will appreciate that communications may be conducted in various ways and among various devices.

A determination is made in operation 511 whether the connection between the client terminal devices 102 and the selected sources is restored. If the connection between the client terminal device 102 and the selected sources is not restored, then the system returns to operation 507. If the connection between the client terminal device 102 and the selected sources is restored, then the system synchronizes data between the local communication device and the selected sources in operation 513 and the system returns to operation 501.

In another embodiment, the technology includes a distributed system with one or multiple locations with an optionally defined central hub. The information on each of the nodes is accessed locally by users in that network and is not limited by the connectivity to any of the other nodes. The information is readily available on all nodes as needed on a continuous or scheduled basis with an algorithm that decides how to synchronize. The synchronization can be made either ubiquitous (e.g., complete) so that each node has the same information, or the synchronization can be selective, in which case it only transfers the minimum data needed to operate, plus any additional data selected. The nodes could be stationed on mobile devices such as a network of mobile phones or mobile vessels such as, for example, but not limited to, a truck, a tank, a boat or an airplane. As a second layer of data transfer, in addition to the database, the file system is also transferred by default in selective mode (e.g., it only transfers the minimum needed to operate). The system is self-maintained and possesses an updated mechanism. It also has a disaster recovery mechanism allowing for the system to fully recover itself with a very short recovery time objective (RTO) and recovery point objective (RPO).

Transfer Technology

Communications from or to the nodes can occur via Transmission Control/Internet Protocol (TCP/IP) using TCP and User Datagram Protocol (UDP) transport protocols. The specific port numbers can be configured at the time of setup. Packages can be compressed using, for example, the ZLib filter which uses the DEFLATE algorithm.

Ubiquitous Database Transfer

Database data can be stored in any standard relational database including, but not limited to, MySQL, PostgresSQL Lite, and MICROSOFT SQL. The database is configured to report binary logs to a pre-defined local location. A daemon reads each bin-log entry and broadcasts to each enabled node. The bin-log is assigned a globally unique ID and then each node attempts to execute the selected bin-log entry one at a time. Each bin-log entry contains one or multiple SQL statements. The statements can be executed in real-time and in case of two statements attempting to affect the same row, the latest insert prevails. Each node manages time by setting a Network Time Protocol (NTP) with predefined time settings.

Execution and Error Resolution

The system can be configured to handle errors in different ways. For example, a Latest Entry Prevails method handles errors by default, by executing all queries and the latest query affecting the same row prevails. Thus, if a conflict arises, each transaction is inserted and a latest inserted occurrence would prevail. In a Priority Node method, a node can be configured to have priority over other nodes. Therefore, if two statements affect the same row within a pre-configured time, the priority node would prevail.

Error Handling

Based on the conflict resolution strategy, the outcome could be handled in several ways. For example:

Stop Execution: If an error statement is detected, synchronization is disabled until manual intervention. This ensures full data integrity across the nodes.

Do nothing: Ignore entries that generate an error and continue to the next statement.

A conflict resolution mechanism can be used where transactions are merged across one or more remote servers 130.

Selective Database (DB) Transfer

The use of Selective DB can be accomplished with any relational database including, for example, MySQL, Postgres, SQLite and MSSQL as well as any Non-SQL protocols such as Elastic, MongoDB, CouchDB or Cassandra. The disclosure is not limited to a specific type of relational database. An atomic record is first established. An atomic record is defined as the core entity in the system needed for business operation, and then all dependent entities attached are automatically encapsulated within the atomic record. The record can then be transferred over TCP/IP to one or all nodes. The record can be transferred via a serialized object. The serialized object can be compressed using a ZLib filter based on the DEFLATE strategy. The receiving end uncompresses the serialized string and serializes the object, re-populating with the latest version of the entity and dependent entities. Thus, no conflict resolution is needed as every entry is inserted as it comes based on the Latest Entry Prevails. Transfer control assurance can be configured to either confirm the receipt of the object or attempt to resend it if it failed to receive it. This option can be disabled to not expect a confirmation-of-receipt to minimize package size.

Selective Files Transfer

Separate from the DB data, the files needed to operate the business logic are identified by the application at runtime by flagging each file with its creation location. All files can be scanned at any preselected intervals, (e.g., scanned every 1-minute) to detect any changes. If another node is requesting the use of the file, then this file is flagged in the requesting node. The flag is transferred to all the nodes via the DB replication. Following this, the file is transferred to any of the requesting nodes. The file can be compressed using ZLib based on the DEFLATE strategy, although other compression protocols may be used. The files can also be deleted from any node where the file is not flagged as being required by the business application.

Self-Maintain and Update Mechanism

The system can install all required updates as flagged by a central server using the LINUX-based Advanced Packaging Tool (APT) package manager. This includes all operating system (OS) layer updates as well as any other required package needed for operation as flagged by configuration on a central server. The application layer is updated by a remote control script that can be written in, for example, BASH, PERL and PYTHON, which retrieves all the required files needed for the application and transfers them to the nodes. Upon completion of this process, each of the nodes sends a notification to all the other nodes using the DB replication and then self-stop replication. The update takes place by backing up the current application and then replacing all files with the new files. The replication is then restored and a notification is sent to the other nodes. In case of an error, the system remains in maintenance mode and awaits manual intervention. All other nodes continue to operate normally.

Disaster Recovery Mechanism Strategy

In case of a disaster, the system is reinstalled and flagged as a "fresh" DB. Upon the start of replication, the required data to operate is transferred from the other nodes to take the system to the latest level of data.

Recovery Point Objective (RPO)

RPO is determined by the bandwidth available at the time of the disaster. The last sequence broadcasted from the node to the other nodes becomes the recovery point objective.

Recovery Time Objective

Recovery time objective is determined by the bandwidth available after the disaster. The fastest the connection, the faster the RPO will be reached.

Break-Glass Mechanism

In case of a disaster or for any trigger previously configured by the business application, the system can issue a Quality of Service (QoS) upgrade request via Simple Network Management Protocol (SNMP) or any other pre-established mechanism to upgrade the QoS and therefore speed up data transfer.

A set of devices and peripherals can be connected to any of terminals devices 102 to collect biometrics data, financial data and/or medical data. The data may be stored locally in terminal device 102, transferred to local server 104 and/or replicated to each of the nodes. The connection from the devices to the terminals can be any standard connection protocol, for example, USB, Serial, BLUETOOTH, Wi-Fi or Network TCP/IP. The data can be transferred using one or more of many different formats such as, for example, HL7, CSV or XML. Biometric data may be collected via the use of one or more traditional data collection methods including but not limited to fingerprint, palm scan, retina scan, and/or facial recognition. Financial data may be collected with the use of one or more scanning techniques such as but not limited to magnetic cards, smart chip cards, BLUETOOTH identifiers and/or barcode ID's. Medical data may be collected with the use of a wide array of medical devices including but not limited to EKG devices, pulse detectors, blood pressure monitors, oximetry sensors, weight and height scales, X-Ray Devices (both digital and film-based), blood analyzers, urine analyzers, stool analyzers, ultrasound devices and Doppler devices, among others.

Figure 6A:
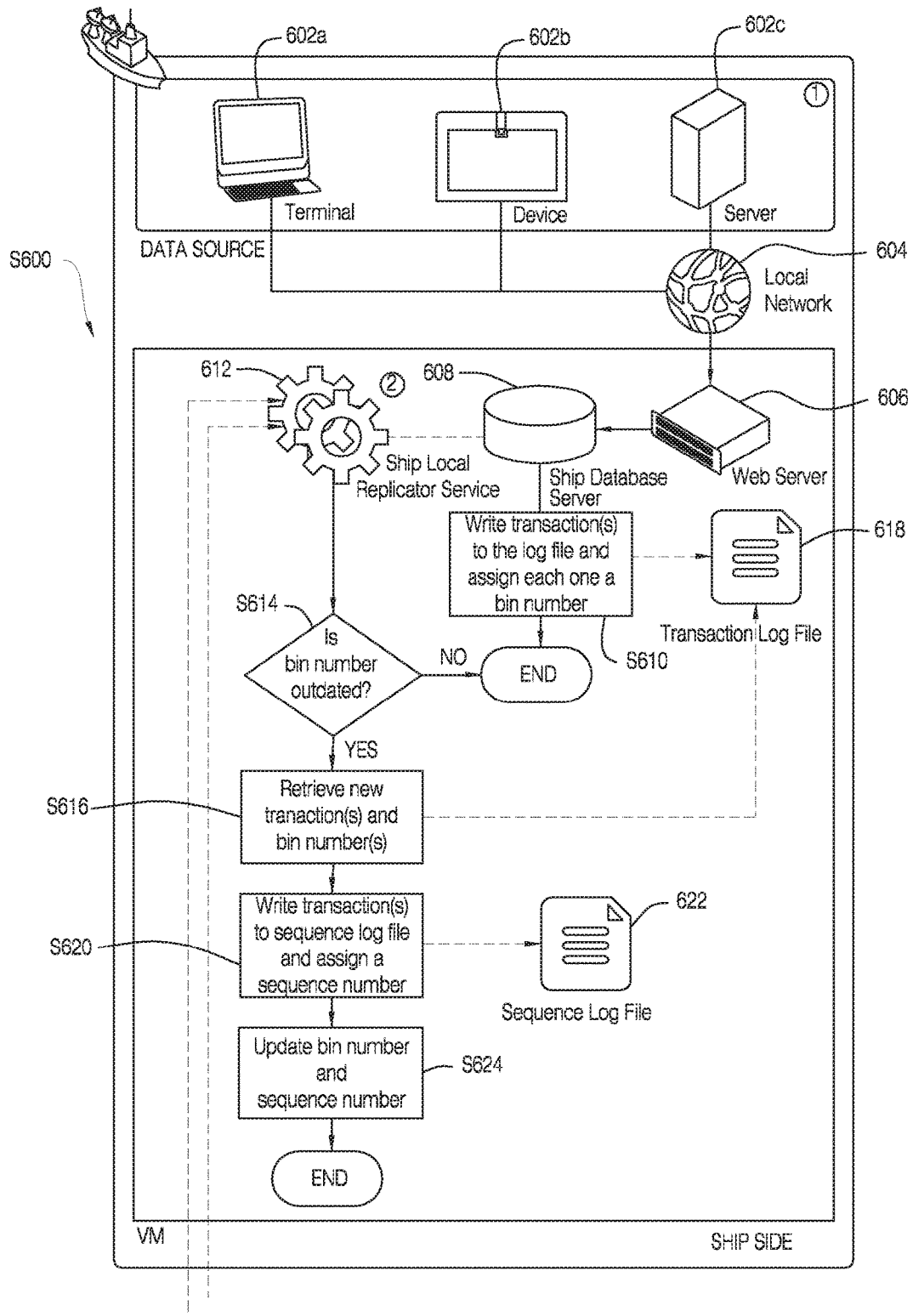
FIG. 6A illustrates a flow chart for a ship-to-shore data replication process, showing the steps performed on the ship side.
Figure 6B:
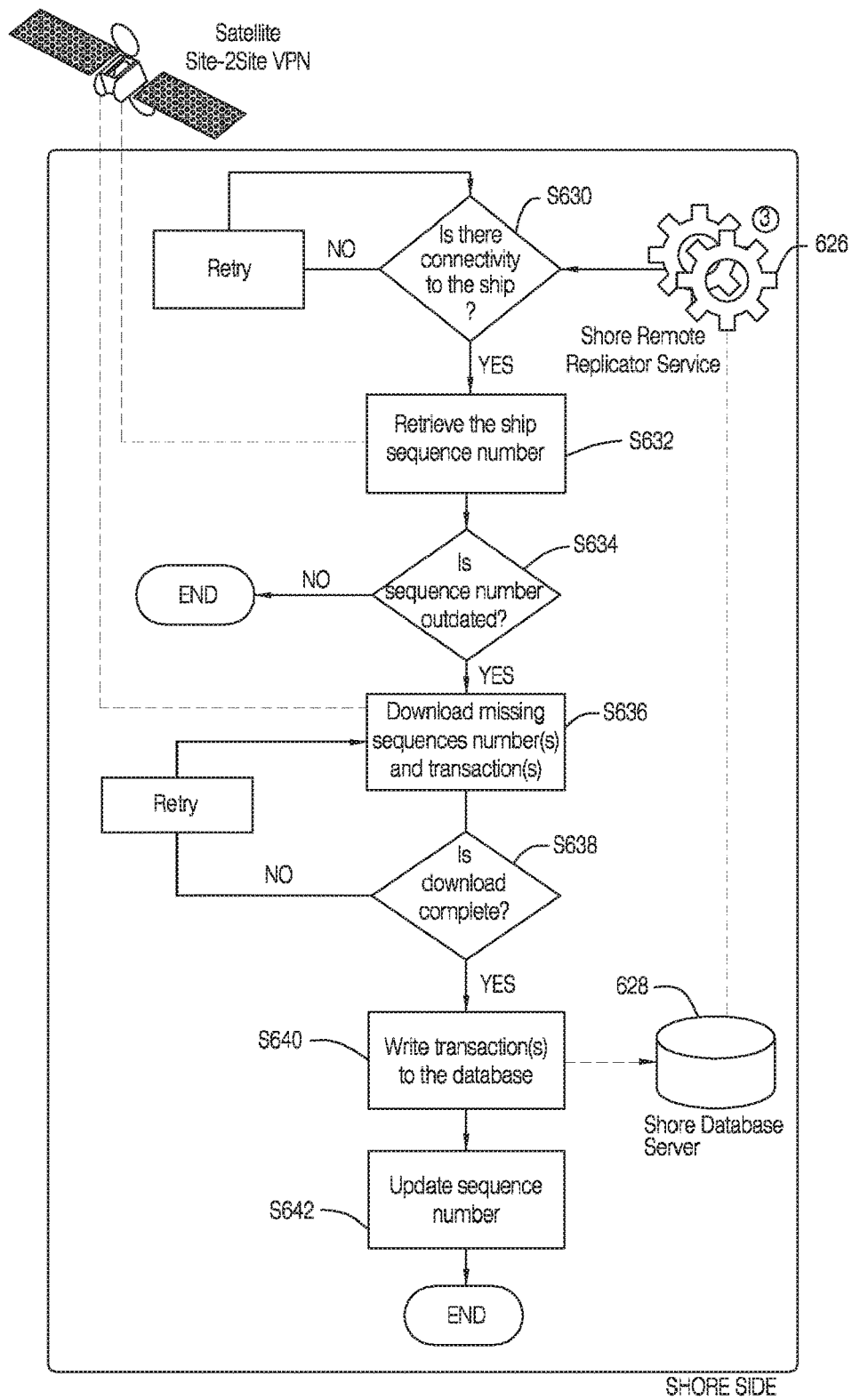
FIG. 6B is a continuation of the flow chart of FIG. 6A, showing the steps performed on the shore side.
Figure 7A:
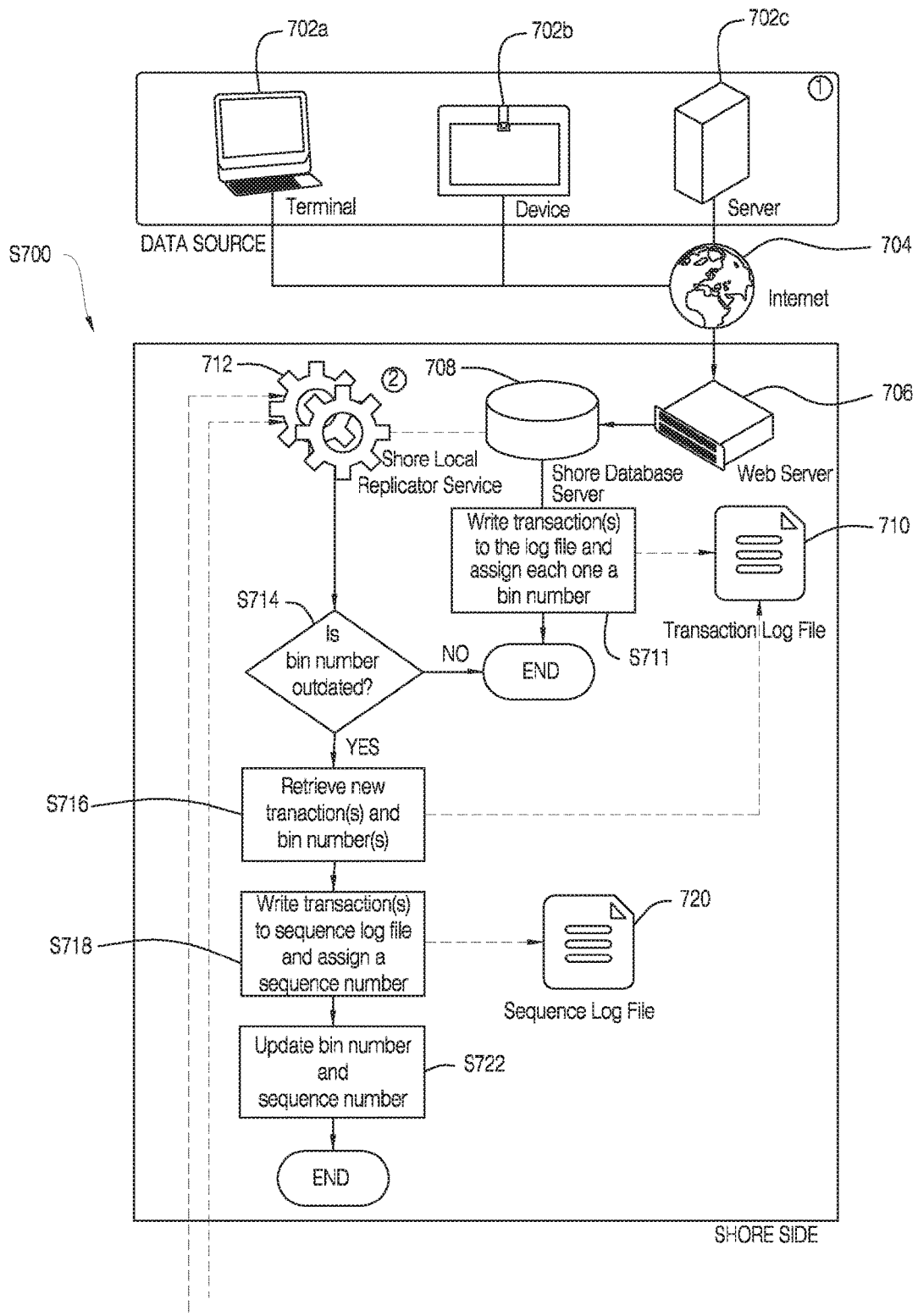
FIG. 7A illustrates a flow chart of a shore-to-ship data replication process, showing the steps performed on the shore side.
Figure 7B:
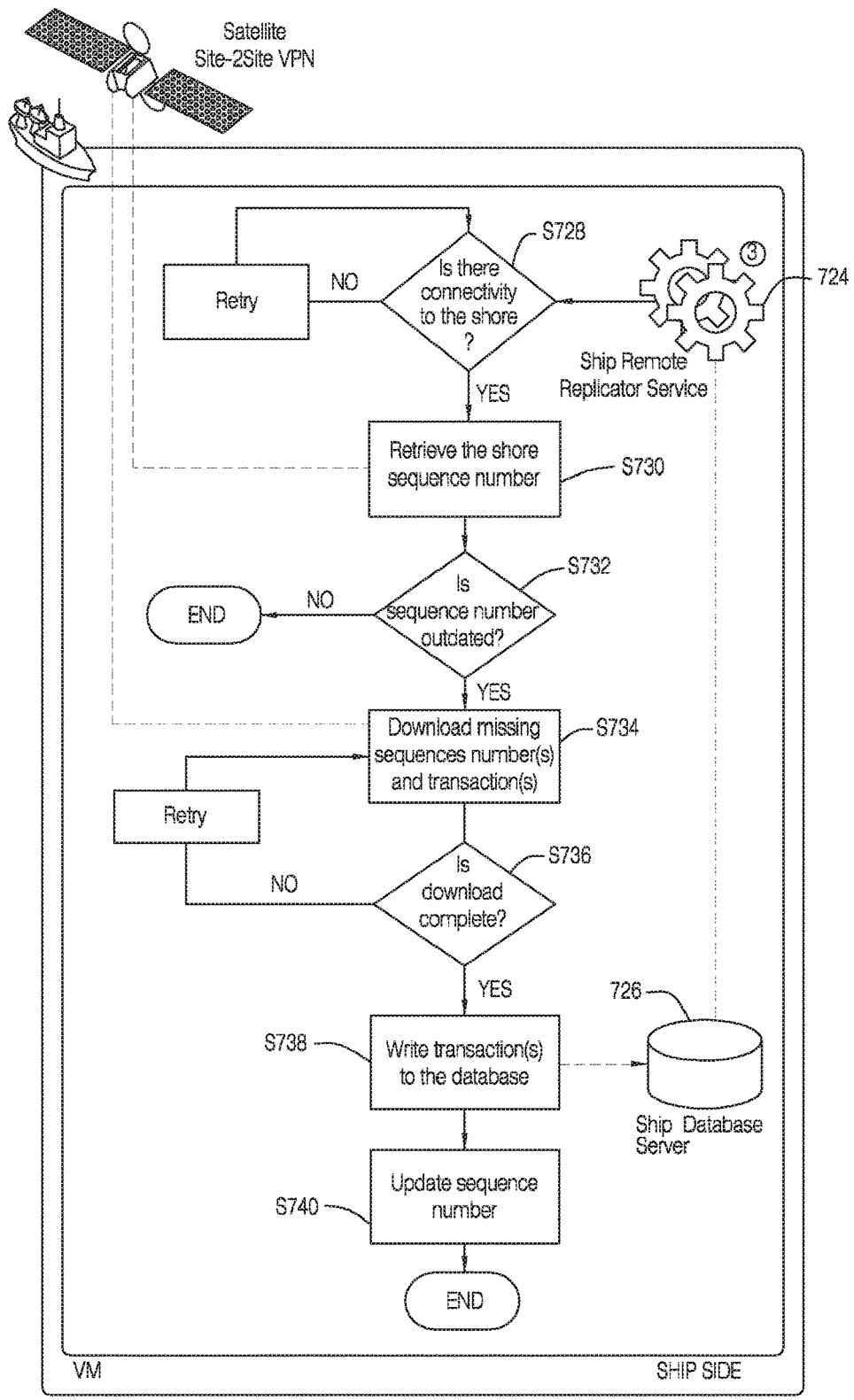
FIG. 7B is a continuation of the flowchart of FIG. 7A, showing the steps performed on the ship side.

In another embodiment, a data replication process used to synchronize the contents of a local database and a remote database, is provided. In one embodiment, the data replication process of the present disclosure is applied to limited connectivity environments such as, for example, a home station in communication with a mine located in a remote region having intermittent connectivity. In one embodiment, as shown in FIGS. 6A and 6B, the local database is located on a ship, while the remote database is located on shore, where, at times, connectivity between the ship and the shore is intermittent. In FIGS. 7A and 7B, the local database is located on shore while the remote database is located on a ship. It is within the scope of the present disclosure that the term "ship" could be any vessel on a body of water such as a ship or, oil platform, or any other type of vessel traveling on a body or water, but may also be an airborne vessel. Thus, the term "ship" as used herein is not limited to only an ocean-bound vessel, as that term is commonly used.

In FIGS. 6A and 6B, a ship-to-shore data replication process (Step S600) of the present disclosure is illustrated. Referring to FIG. 6A, data is entered into a ship-side application via one or more data input devices on a ship. The data input devices could be, for example, a user terminal 602a (i.e., a PC, laptop, iPad, mobile phone, etc.), a device 602b (i.e., a medical data capture tool such as, for example, an i-Stat device, a Picolo diagnostic instrument or a QBC analyzer, etc.), and/or a server 602c (i.e., as part of, for example, a demographics or document import system etc.), (devices 602a, 602b, and 602c referred to collectively herein as "data terminal 602"). The data is transferred from data terminal 602 to the ship web server 606 via a local communications network 604. The ship web server 606 connects to a ship database server 608 and provides the data that was received from the data terminal 602. In order to avoid data conflicts, a ship side software application assigns a universal unique identifier (UUID) to each record of the data. The ship database server 608 writes the data into a local transaction log file 618 and assigns each data transaction a bin number (Step S610). Thus, each time a query is run in ship database server 608, a new bin number is assigned to it.

Figure 8:
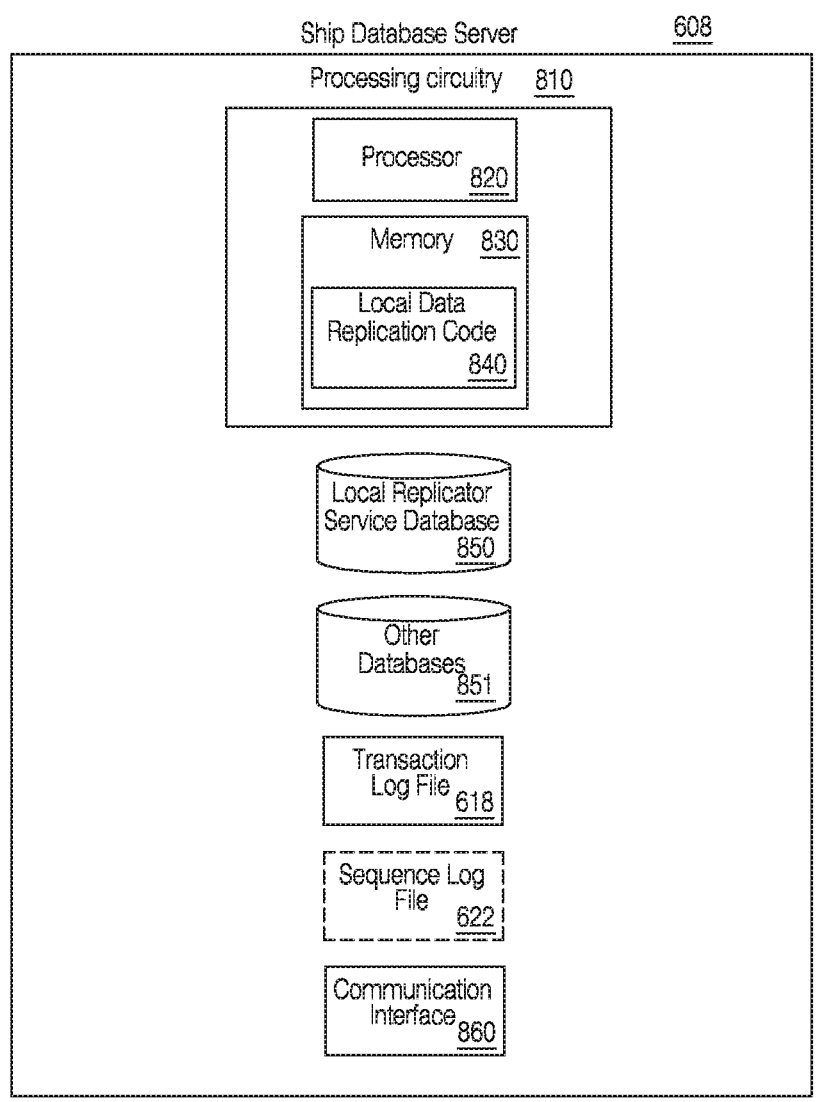
FIG. 8 is a block diagram of a ship database server constructed in accordance with the principles of the present disclosure.

The ship also includes a local replicator service 612. Local replicator service 612 is a software program that is stored either in local ship database server 608 or in a remote server. FIG. 8 is a block diagram of ship database server 608 and the components therein. Ship database server 608 includes processing circuitry 810, which includes a processor includes a processor 820 and a memory 830. Memory 830 may include local data replication code 840, discussed in further detail below. Processor 820 is configured to perform all or some of the processes described herein, with respect to ship database server 608, as described in further detail below. In addition to a traditional processor and memory and the microcontroller arrangement described above, processing circuitry 810 may include integrated circuitry for processing and/or control, e.g., one or more processors and/or processor cores and/or FPGAs (Field Programmable Gate Array) and/or ASICs (Application Specific Integrated Circuitry). Processing circuitry 810 may include and/or be connected to and/or be configured for accessing (e.g., writing to and/or reading from) memory 830, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 830 may be configured to store code executable by control circuitry and/or other data, e.g., data pertaining to communication, e.g., configuration and/or calibration of input data, etc. Processing circuitry 810 may be configured to control any of the methods described herein and/or to cause such methods to be performed, e.g., by processor 820. Corresponding instructions may be stored in the memory 830, which may be readable and/or readably connected to the processing circuitry 810. In other words, processing circuitry 810 may include a controller, which may comprise a microprocessor and/or microcontroller and/or FPGA (Field-Programmable Gate Array) device and/or ASIC (Application Specific Integrated Circuit) device. It may be considered that processing circuitry 810 includes or may be connected or connectable to memory, which may be configured to be accessible for reading and/or writing by the controller and/or processing circuitry 810.

Ship database server 608 may also include its own dedicated local replicator service database 850 and a communication interface 860 to enable for the exchange of data with other components in FIGS. 6A and 6B. Ship database server 608 may also include other databases 851 and transaction log file 618. Sequence log file 622 may also be located in ship database 608. Thus, in one embodiment, sequence log file 622 is stored in the same database where local replicator service 612 is stored, i.e., ship database 608. However, if local replicator service 612 were stored in a remote server, then sequence log file 622 is also stored in the remote server. Some examples of the other databases 851 included in ship database server 608 are as follows. Ship database server 608 includes replicator service database 850 and may also include other databases used by the replicator service. For example, in one embodiment, if two ships are replicating data to the shore, there are three database servers, i.e., one in the first ship, one in the second ship, and one on shore. Each of the three database servers can include, for example, four databases: a first application database used by the application running the data synchronization program, another database used to store the replication status of the first ship, one used to store the replication status of the second ship, and one used to store the replication status on shore, where the replication status means the sequence numbers, the bin numbers, the timestamps and the online status. i.e., replicator service database 850, and two more databases (one for each ship) which are used by each ship's replicator service. Thus, as shown in FIG. 8, ship database server 608 may include multiple databases.

Referring again to FIG. 6A, in one embodiment, local replicator service 612 is installed in ship database server 608. Local replicator service 612 may, in one embodiment, be a series of software instructions, i.e., ship local replication code 840, processed by processor 820. However, as mentioned above, it is within the scope of the present disclosure to provide a separate dedicated server, including its own dedicated processor, other than ship database server 608 to store and process local replicator service 612. Local replicator service 612 monitors changes in the transaction log file 618 using the assigned bin numbers and determines if the bin number assigned to a particular data transaction stored in ship database server 608 is different than the last bin number ship local replicator service 612 is aware of, i.e., whether the bin number has changed or is "outdated" (Step S614). If the bin number is outdated, ship local replicator service retrieves new transaction(s) and bin number(s) (Step S616), inserts the new transaction(s) into a sequence log file 622 and assigns a sequence number to one or more new transactions (Step S620). The new sequence numbers are stored in sequence log file 622, and the bin number and sequence numbers are updated (Step S624). In one embodiment, memory 830 of ship database server 608 temporarily hosts the data transactions prior to the transactions being permanently stored in sequence log file 622. Of note, transaction log file 618 is stored in ship database server 608 and sequence log file 622 may either be stored in ship database server 608 or in separate dedicated server for ship local replicator service 612. Further, in one embodiment, local replicator service database 850 can store and thus keep track of bin numbers and/or sequence numbers.

Local replicator service 612 may also, in response to a request by a remote replicator service, provide, to the remote replicator service, access to the first sequence number, the remote replicator service having access to a second sequence number stored in a remote database, and the first sequence number does not match the second sequence number, local replicator service 612 provides, to the remote replicator service, access to at least one subsequent data transaction associated with the first sequence number, the remote replication service updating the remote database to include the at least one subsequent data transaction.

Of note, the components depicted in FIG. 6A may be run on a Virtual Machine (VM), which provides the functionality to execute an operating system that performs the tasks depicted in FIG. 6A.

Turning now to FIG. 6B, a flow diagram is shown illustrating the portion of data replication process S600 taking place on the shore side. A shore remote replicator service 626, which, in one embodiment, is software installed in a shore database server 628, is in communication with ship local replicator service 612. The communication between shore remote replicator service 626 and ship local replicator service 612 can be via any type of wireless communication network including but not limited to satellite communication, such as, for example, via Wi-Fi, a local area network (LAN), digital subscriber line (DSL), and mobile communication. Thus, although a satellite is shown in FIG. 6B, the means of communication between the ship and the shore replicator services can be by any type of wireless communication protocol and is not limited to only satellite communications. In one embodiment, the connection used to transfer data in both directions (i.e., ship-to-shore and shore-to-ship) is encrypted over a secure sockets layer (SSL). Data that is not being exchanged and is being stored in a database may also be protected via encryption, i.e., an AES encryption 256 bit key size).

Figure 9:
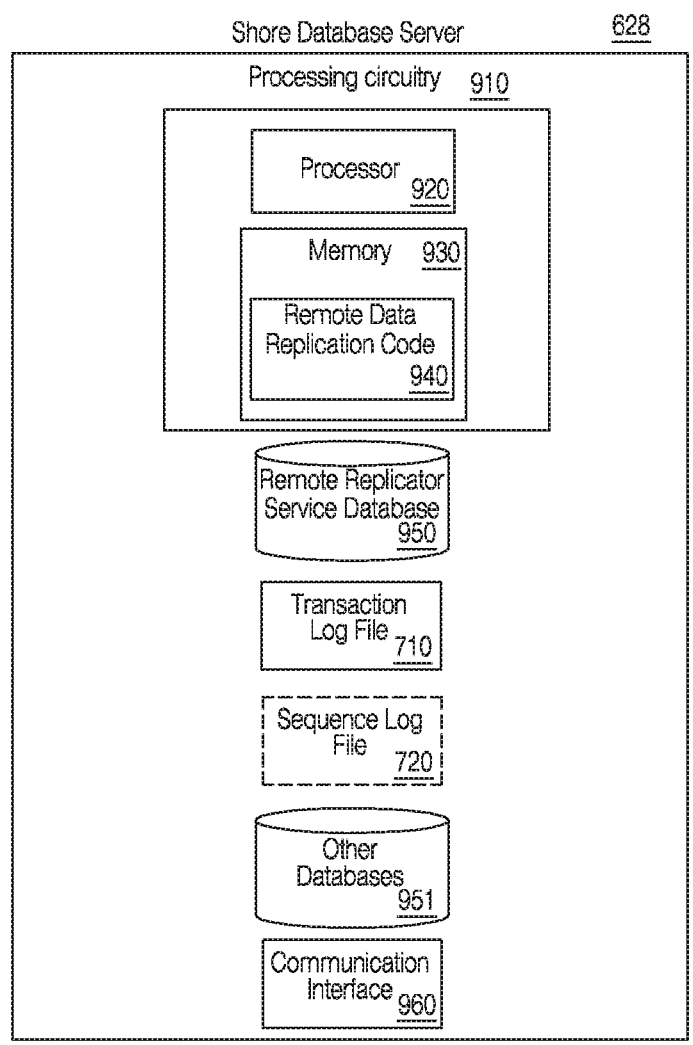
FIG. 9 is a block diagram of a shore database server constructed in accordance with the principles of the present disclosure.

Similar to ship database server 608, shore remote database server 628 includes, as shown in FIG. 9 and discussed in further detail below, processing circuitry 910, which includes a processor includes a processor 920 and a memory 930. Memory 930 may include remote data replication code 940, discussed in further detail below. Processor 920 is configured to perform all or some of the processes described herein, with respect to shore remote database server 628, as described in further detail below. In addition to a traditional processor and memory and the microcontroller arrangement described above, processing circuitry 910 may include integrated circuitry for processing and/or control, e.g., one or more processors and/or processor cores and/or FPGAs (Field Programmable Gate Array) and/or ASICs (Application Specific Integrated Circuitry). Processing circuitry 910 may include and/or be connected to and/or be configured for accessing (e.g., writing to and/or reading from) memory 930, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 930 may be configured to store code executable by control circuitry and/or other data, e.g., data pertaining to communication, e.g., configuration and/or calibration of input data, etc. Processing circuitry 910 may be configured to control any of the methods described herein and/or to cause such methods to be performed, e.g., by processor 920. Corresponding instructions may be stored in the memory 930, which may be readable and/or readably connected to the processing circuitry 910. In other words, processing circuitry 910 may include a controller, which may comprise a microprocessor and/or microcontroller and/or FPGA (Field-Programmable Gate Array) device and/or ASIC (Application Specific Integrated Circuit) device. It may be considered that processing circuitry 910 includes or may be connected or connectable to memory, which may be configured to be accessible for reading and/or writing by the controller and/or processing circuitry 910.

Shore remote database server 628 may also include its own dedicated remote replicator service database 950, other databases 951, and a communication interface 960 to enable for the exchange of data with other components in FIGS. 6A and 6B. In one embodiment, shore remote replicator service 626 is a series of software instructions, operable by processor 920, and is stored in shore database server 628. However, it is within the scope of the present disclosure to provide a separate dedicated server, and separate processor, other than shore remote database server 628 and processor 920, to store and process remote shore replicator service 626. Shore remote database server 628 may also include transaction log file 710, and in some embodiments, sequence log file 720.

Referring again to FIG. 6B, if there is connectivity to the ship (Step S630), shore remote replicator service 626 is in communication with ship local replicator service 612 via communication interface 960, constantly queries ship local replicator service 612 for its sequence numbers, and retrieves the ship's sequence numbers (Step S632). Processor 920, in conjunction with remote data replication code 940 of shore remote database server 628 compares the already applied sequence numbers with the sequence numbers received from the ship. In other words, if the sequence numbers received by shore remote replicator service 626 are greater than the last sequence number processed by shore remote database server 628, this means that shore remote database server 628 has not yet processed the transactions related to this last sequence number and these transactions must be processed by shore remote database server 628. In other words, since the sequence numbers are incremental, if the last sequence number that shore remote replicator service 626 is aware of (i.e., meaning the transactions related to the last sequence number were already processed by shore remote database server 628) is the same as the last sequence number that ship remote replicator service 612 is aware of, then shore remote replicator service 626 knows that the last sequence number was already applied. If the sequence numbers are different, i.e., outdated (Step S634), then shore replicator service 626 retrieves (i.e., downloads) one or more (for example, 10 at a time) missing sequence numbers and their associated transactions from the ship local replicator service 612 (Step S636), which retrieves the sequence numbers from its dedicated replicator service database 850 in ship database server 608 and the transactions related to those sequence numbers from the sequence log file 622.

If the connection to the ship is interrupted at any time during the process, shore remote replicator service 626 retries until it successfully retrieves the transactions. Once the download is complete (Step S638), processor 920 of shore remote database server 628 writes the transactions into database 951 in shore database server 628 (Step S640) and updates the sequence numbers in its own dedicated remote replicator service database 950 in shore database server 628 (Step S642). In this fashion, the data stored in shore database server 628 corresponds to the data stored in ship database server 608.

In FIGS. 7A and 7B, a shore-to-ship data replication process (Step S700) of the present disclosure is illustrated. Referring to FIG. 7A, data is entered into a shore-side application in one or more devices, i.e., a user terminal 702a (i.e., a PC, laptop, iPad, mobile phone, etc.), a device 702b (i.e., a medical data capture tool such as, for example, an i-Stat device, a Picolo or QBC analyzer, etc.), and/or a server 702c (i.e., as part of, for example, a demographics or document import system, etc.), (collectively data terminal 702). The data is transferred from data terminal 702 to web server 706 via a wireless data communication network, i.e., an Internet connection 704. Web server 706 connects to shore database server 708 and provides the data received from the data terminal 702. In order to avoid data conflicts, a shore-side application assigns a universal unique identifier (UUID) to each record of the data. The shore database server 708 writes the data into a local transaction log file 710 and assigns each data transaction a bin number (Step S711).

On the shore-side, a local shore replicator service 712 is shown. Local replicator service 712 represents software instructions stored either in a remote dedicated server or in shore database server 708. Shore database server 706 includes the same components as shore database server 628 illustrated in FIG. 9. Local shore replicator service 712 of shore database server 708 monitors changes in the database transaction log file 710 using the assigned bin numbers and determines, via processor 920 in conjunction with replication code 940, if the bin number assigned to a particular transaction stored in shore database server 708 is different than the last bin number shore local replicator service 712 is aware of, i.e., whether the bin number is outdated (Step S714). If the bin number is outdated, local shore replicator service 712 retrieves new transaction(s) and bin number(s), via communication interface 960 (Step S716), and inserts at least one new transaction into sequence log file 720 and processor 920 in conjunction with replication code 940 assigns a sequence number to one or more new transactions (Step S718). The new sequence numbers are stored in sequence log file 720, and the bin number and sequence numbers are updated (Step S722). In one embodiment, memory 930 temporarily hosts the data transactions prior to the transactions being permanently stored in sequence log file 720. Of note, transaction log file 710 is stored in shore database server 708 and sequence log file 720 may either be stored in shore database server 708 or in a separate dedicated server for remote replicator service 712. Further, in one embodiment, remote replicator service database 950 can store and thus keep track of bin numbers and/or sequence numbers.

Turning now to FIG. 7B, a flow diagram is shown illustrating the portion of data replication process S700 taking place on the ship side. A ship remote replicator service 724, which in one embodiment, is installed in a ship database server 726, is in communication with local shore-side replicator service 712. However, it is within the scope of the present disclosure to provide a separate dedicated server other than ship database server 726 to store remote replicator service 724. The communication between ship remote replicator service 724 and local shore-side replicator service 712 can be via any type of wireless communication network including but not limited to satellite communication, Wi-Fi communication, and mobile communication, as described above. The components of ship database server 726 are the same as those of ship database server 608 shown in FIG. 8.

If there is connectivity to the shore (Step S728), ship remote replicator service 724 constantly queries local shore-side replicator service 712 for its sequence number and retrieves the shore sequence number (Step S730). Ship remote replicator service 724 compares the already applied sequence numbers with the sequence numbers received from the shore. If the sequence number is different, i.e., outdated (Step S732), then ship replicator service 724 retrieves (i.e., downloads) one or more (for example, 10 at a time) missing sequence numbers and their associate transactions from the shore local replicator service 712 (Step S734), which retrieves the sequence numbers from its dedicated replicator service database 850 in ship database server 608 and the transactions related to those sequence numbers from the sequence log file 622. If the connection to the shore is interrupted at any time during the process, ship replicator service 724 retries until it successfully retrieves the transactions. Once the download is complete (Step S736), ship replicator service 724 writes the transactions to a database (i.e., database 951) in the ship database server 726 (Step S738) and updates the sequence number (Step S740). In this fashion, the data stored in ship-side database 726 corresponds to the data in shore database 708.

It should be noted that in each ship and shore instance (i.e., ship-to-shore communication shown in FIGS. 6A and 6B, and shore-to-ship communication shown in FIGS. 7A and 7B), two replication services are running at the same time. For example, using the ship-to-shore scenario of FIGS. 6A and 6B, one of the replication services, i.e., ship local replication service 612, is used to monitor local ship database server 608 and database transaction log file 618, write changes into the sequence log file 622, and answer queries from the shore remote replicator service 626, while the other replication service, i.e., shore remote replicator service 626 is used to query the ship local replicator service 612 for its sequence number. In the shore-to-ship communication sequence shown in FIGS. 7A and 7B, shore local replicator service 712 monitors database 708 and transaction log file 710, writes the changes to the sequence log file 720 and answer queries from the ship remote replicator service 724, while the other replicator service, i.e., ship remote replicator service 724 is used to query the shore local replicator service 712 for its sequence number. If connectivity between replicators is lost, the replicators will remain idle until connection is restored and then continue comparing sequence numbers, downloading the missing sequence numbers and applying the missing sequence numbers to the local database.

Of note, the components depicted in FIG. 7B may be run on a Virtual Machine (VM), which provides the functionality to execute an operating system that performs the tasks depicted in FIG. 7B.

The data replication process depicted in FIGS. 6A through 7B is a data replication process and results in the avoidance of data conflicts when high volumes of data and complex application profiles are used across numerous sites. Further, the data replication process of the present disclosure results in a high-speed exchange of data over what might be unreliable or intermittent connectivity while preserving the ability to aggregate large quantities of synchronized data over an often complicated schema.

The invention can be realized in hardware, software, or a combination of hardware and software. Any kind of computing system, or other apparatus adapted for carrying out the methods described herein, is suited to perform the functions described herein.

A typical combination of hardware and software could be a specialized computer system having one or more processing elements and a computer program stored on a storage medium that, when loaded and executed, controls the computer system such that it carries out the methods described herein. The invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for synchronizing contents of a local database with contents of a remote database, the method comprising:
  writing at least one data transaction received from a user terminal from the local database to a local transaction log file;
  assigning a bin number to each of the at least one data transaction;
  determining, by a local replicator service, if the assigned bin number has changed due to receipt of at least one subsequent data transaction;
  if the bin number has changed, inserting, by the local replicator service, the at least one subsequent data transaction into a local sequence log file and assigning the at least one subsequent data transaction a first sequence number;
  in response to a request by a remote replicator service, providing, to the remote replicator service, access to the first sequence number, the remote replicator service having access to a second sequence number stored in the remote database; and if the first sequence number does not match the second sequence number,
   providing, to the remote replicator service, access to the at least one subsequent data transaction associated with the first sequence number, the remote replication service updating the remote database to include the at least one subsequent data transaction.

2. The method of claim 1, further comprising assigning a universal unique identifier (UUID) to each data record received from the user terminal.

3. The method of claim 1, further comprising monitoring changes in the transaction log file using the assigned bin number.

4. The method of claim 1, wherein the local database is located on a vessel and the remote database is located on shore.

5. The method of claim 1, wherein the local replicator service and the remote replicator service communicate with each other via a satellite connection.

6. The method of claim 1, wherein the local replicator service and the remote replicator service are in operation at the same time.

7. A local database server configured to synchronize contents of a local database with contents of a remote database, the local database server comprising:
   a local transaction log file;
   processing circuitry including a memory and a processor, the memory in communication with the processor, the memory having instructions that, when executed by the processor, configure the processor to:
      write at least one data transaction received from a user terminal from the local database to the local transaction log file;
      assign a bin number to each of the at least one data transaction;
      determine, by a local replicator service, if the assigned bin number has changed due to receipt of at least one subsequent data transaction;
      if the bin number has changed, insert, by the local replicator service, the at least one subsequent data transaction into a local sequence log file and assign the at least one subsequent data transaction a first sequence number; and
   a communication interface configured to receive a request from a remote replicator service,
   in response to the request from the remote replicator service, the processor is further configured to:
      provide, to the remote replicator service, access to the first sequence number, the remote replicator service having access to a second sequence number stored in the remote database; and
      if the first sequence number does not match the second sequence number,
         provide, to the remote replicator service, access to the at least one subsequent data transaction associated with the first sequence number, the remote replication service updating the remote database to include the at least one subsequent data transaction.

8. The database server of claim 7, wherein the processor is further configured to assign a universal unique identifier (UUID) to each data record received from the user terminal.

9. The database server of claim 7, wherein the processor is further configured to monitor changes in the transaction log file using the assigned bin number.

10. The database server of claim 7, wherein the local database is located on a vessel and the remote database is located on shore.

11. The database server of claim 7, wherein the local replicator service and the remote replicator service communicate with each other via a satellite connection.

12. The database server of claim 7, wherein the local replicator service and the remote replicator service are in operation at the same time.

13. A remote database server configured to synchronize contents of a local database with contents of a remote database, the remote database comprising:
   a communications interface configured to:
      receive, from a local replicator service, a first sequence number, the first sequence number associated with at least one data transaction, the local replicator service configured to assign the at least one data transaction the first sequence number upon determining if a bin number assigned to each of the at least one data transaction has changed due to receipt of at least one subsequent data transaction; and
   processing circuitry including a memory and a processor, the memory in communication with the processor, the memory having instructions that, when executed by the processor, configure the processor to:
      compare, by a remote replicator service, the first sequence number received from the local replicator service to a second sequence number, the second sequence number associated with a latest data transaction stored in the remote database; and
      if the first sequence number does not match the second sequence number,
         obtain from the local replicator service, via the communications interface, the at least one data transaction associated with the first sequence number; and
      the processor is further configured to write the at least one data transaction to the remote database.

14. The remote database server of claim 13, wherein the local database is located on a vessel and the remote database is located on shore.

15. The remote database server of claim 13, wherein the local replicator service and the remote replicator service are in operation at the same time.

16. A system for synchronizing data transactions stored in a local database with data transactions stored in a remote database, the system comprising:
   a local database server comprising:
      a local transaction log file;
      processing circuitry including a memory and a processor, the memory in communication with the processor, the memory having instructions that, when executed by the processor, configure the processor to:
         write at least one data transaction received from a user terminal from the local database to the local transaction log file;
         assign a bin number to each of the at least one data transaction;
         determine, by a local replicator service, if the assigned bin number has changed due to receipt of at least one subsequent data transaction;
         if the bin number has changed, insert, by the local replicator service, the at least one subsequent data transaction into a local sequence log file and assign the at least one subsequent data transaction a first sequence number; and a local communication interface configured to communicate with a remote replicator service, a remote database server comprising:

a remote communications interface configured to receive, from the local replicator service, the first sequence number; and processing circuitry including a memory and a processor, the memory in communication with the processor, the memory having instructions that, when executed by the processor, configure the processor to:

compare, by the remote replicator service, the first sequence number received from the local replicator service to a second sequence number, the second sequence number associated with a latest data transaction stored in the remote database; and if the first sequence number does not match the second sequence number, obtain from the local replicator service, via the remote communications interface, the at least one data transaction associated with the first sequence number; and the processor further configured to write the at least one data transaction to the remote database.

17. The system of claim 16, wherein the local database is located on a vessel and the remote database is located on shore.

18. The system of claim 16, wherein the local replicator service and the remote replicator service communicate with each other via a satellite connection.

19. The system of claim 16, wherein the local replicator service and the remote replicator service are in operation at the same time.

20. The system of claim 16, wherein the local database server further comprises a sequence log file for storing the first sequence number.

* * * * *